US012681257B2

(12) United States Patent \
 Chao et al.

(10) Patent No.: US 12,681,257 B2 \
(45) Date of Patent: Jul. 14, 2026

(54) OPTICAL MODULE

(71) Applicant: PEGATRON CORPORATION, Taipei City (TW)

(72) Inventors: Chi-Yao Chao, Taipei City (TW); Che-Wei Hsu, Taipei City (TW); Chien-Chung Chueh, Taipei City (TW)

(73) Assignee: PEGATRON CORPORATION, Taipei City (TW)

( * ) Notice: Subject to any disclaimer, the term of this patent is extended or adjusted under 35 U.S.C. 154(b) by 299 days.

(21) Appl. No.: 18/545,033

(22) Filed: Dec. 19, 2023

(65) Prior Publication Data

US 2024/0310600 A1 Sep. 19, 2024

(30) Foreign Application Priority Data

Mar. 16, 2023 (TW) ................................. 112109858

(51) Int. Cl.
 *G02B 7/02* (2021.01)
 *G02B 7/10* (2021.01)
 *G02B 27/01* (2006.01)

(52) U.S. Cl.
 CPC ............. *G02B 7/021* (2013.01); *G02B 7/022* (2013.01); *G02B 7/023* (2013.01); *G02B 27/0172* (2013.01); *G02B 7/10* (2013.01)

(58) Field of Classification Search
 CPC ........ G02B 7/021; G02B 7/022; G02B 7/023; G02B 27/0172; G02B 7/10
 See application file for complete search history.

(56) References Cited

U.S. PATENT DOCUMENTS

| | | | | |
|---|---|---|---|---|
| 4,621,906 A | * | 11/1986 | Hashimoto | .............. G02B 7/09 |
| | | | | 359/698 |
| 2020/0326501 A1 | * | 10/2020 | Huang | ................... G02B 7/021 |
| 2022/0137316 A1 | * | 5/2022 | Yoon | ...................... G02B 7/021 |
| | | | | 359/822 |

FOREIGN PATENT DOCUMENTS

CN        209248159        8/2019

* cited by examiner

*Primary Examiner* — Nathanael R Briggs \
(74) *Attorney, Agent, or Firm* — J.C. PATENTS

(57) ABSTRACT

An optical module includes a first lens assembly including a first lens holder and a first lens fixed to the first lens holder, a second lens assembly, and an adjustment member. The first lens holder has at least one guiding inclined groove having a first stroke end and a second stroke end. In a direction parallel to an optical axis of the first lens, a stroke difference is provided between the second and first stroke end. The second lens assembly includes a second lens holder slidably disposed in the first lens holder, a second lens fixed to the second lens holder, and at least one guiding member slidably disposed in the second lens holder and slidably connected to the guiding inclined groove. The adjustment member is rotatably sleeved on the first lens holder. The guiding member penetrates the guiding inclined groove to be coupled to the adjustment member.

13 Claims, 8 Drawing Sheets

OPTICAL MODULE

CROSS-REFERENCE TO RELATED APPLICATION

This application claims the priority benefit of Taiwan application serial no. 112109858, filed on Mar. 16, 2023. The entirety of the above-mentioned patent application is hereby incorporated by reference herein and made a part of this specification.

BACKGROUND

Technology Field

The disclosure relates to an optical module, and in particular, relates to an optical module applied in a head-mounted display device.

Description of Related Art

A common head-mounted display device includes a display and an optical module disposed on one side of the display. The optical module includes two convex lenses arranged side by side. Since everyone's vision is different, an adjustment mechanism is provided in the optical module most of the time to adjust the distance between the two convex lenses to adjust the position of the focal plane. Generally, the two convex lenses are a fixed lens and a movable lens. Further, the adjustment mechanism of the rotating lens is used most of the time in the adjustment mechanism to drive the movable lens to move closer to or away from the fixed lens. However, when the adjustment mechanism drives the movable lens to move closer to or away from the fixed lens, the movable lens will rotate at the same time, causing the optical axis of the movable lens to shift. The imaging quality is thereby affected. Further, the shape of the lens in the adjustment mechanism of the rotating lens is required to be circular and cannot be arbitrarily designed according to space requirements. Therefore, when wearing the head-mounted display device, the structure may easily interfere with the bridge of the user's nose, causing discomfort to the user.

SUMMARY

The disclosure provides an optical module in which the position of the focal plane can be adjusted, so that imaging quality is improved, and the lens shape can be arbitrarily designed according to space requirements to improve wearing comfort.

The disclosure provides an optical module including a first lens assembly, a second lens assembly, and an adjustment member. The first lens assembly includes a first lens holder and a first lens fixed to the first lens holder. The first lens holder has at least one guiding inclined groove, and the first lens has an optical axis. The guiding inclined groove has a first stroke end and a second stroke end opposite to the first stroke end. In a direction parallel to the optical axis, a stroke difference is provided between the second stroke end and the first stroke end. The second lens assembly includes a second lens holder slidably disposed in the first lens holder, a second lens fixed to the second lens holder, and at least one guiding member slidably disposed in the second lens holder and slidably connected to the guiding inclined groove. The adjustment member is rotatably sleeved on the first lens holder, and the guiding member penetrates through the guiding inclined groove to be coupled to the adjustment member. When the adjustment member rotates around the optical axis of the first lens, the adjustment member drives the guiding member to slide relative to the second lens holder and the guiding member slides relative to the first lens holder along the guiding inclined groove, so as to drive the second lens holder to slide relative to the first lens holder in the direction parallel to the optical axis.

To sum up, the user can turn the adjustment member to drive the second lens to slide relative to the first lens to adjust the distance between the first lens and the second lens. In this way, the user can adjust the position of the focal plane according to his or her personal vision to view a clear image. Further, during the process of the second lens sliding relative to the first lens, the second lens does not rotate around the optical axis of the first lens, so the optical axis of the second lens can be prevented from shifting, and the imaging quality is thus improved. Moreover, the lenses do not need to be designed to be circular because the lenses do not need to rotate. Therefore, the shape of the lenses may be arbitrarily designed according to space requirements, so the optical module is prevented from interfering with the bridge of the user's nose, and the wearing comfort is thus improved.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1A:
FIG. 1A is a schematic view of an optical module in a first state according to an embodiment of the disclosure.
Figure 1B:
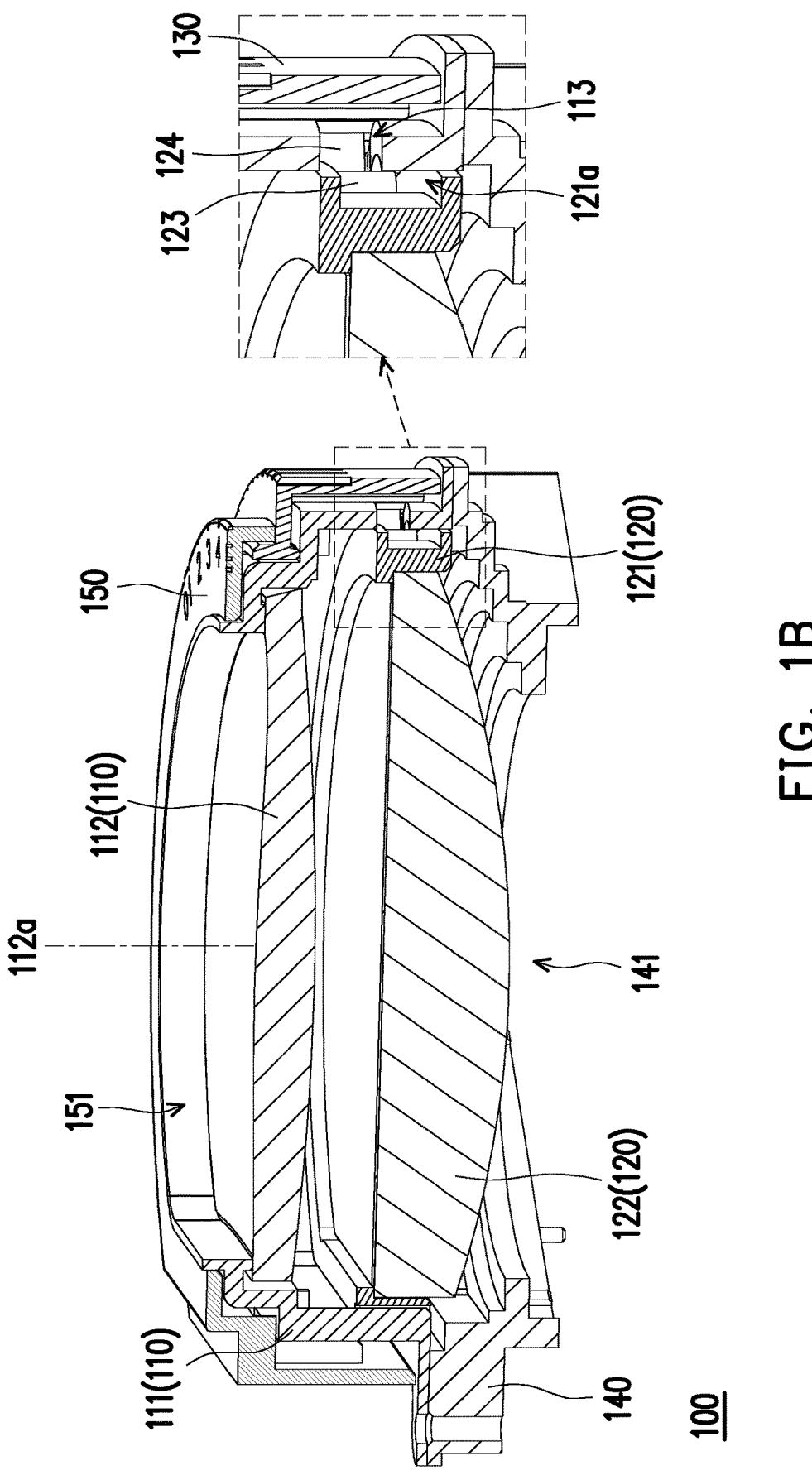
FIG. 1B and FIG. 1C are cross-sectional schematic views of the optical module of FIG. 1A at two different viewing angles.
Figure 1C:
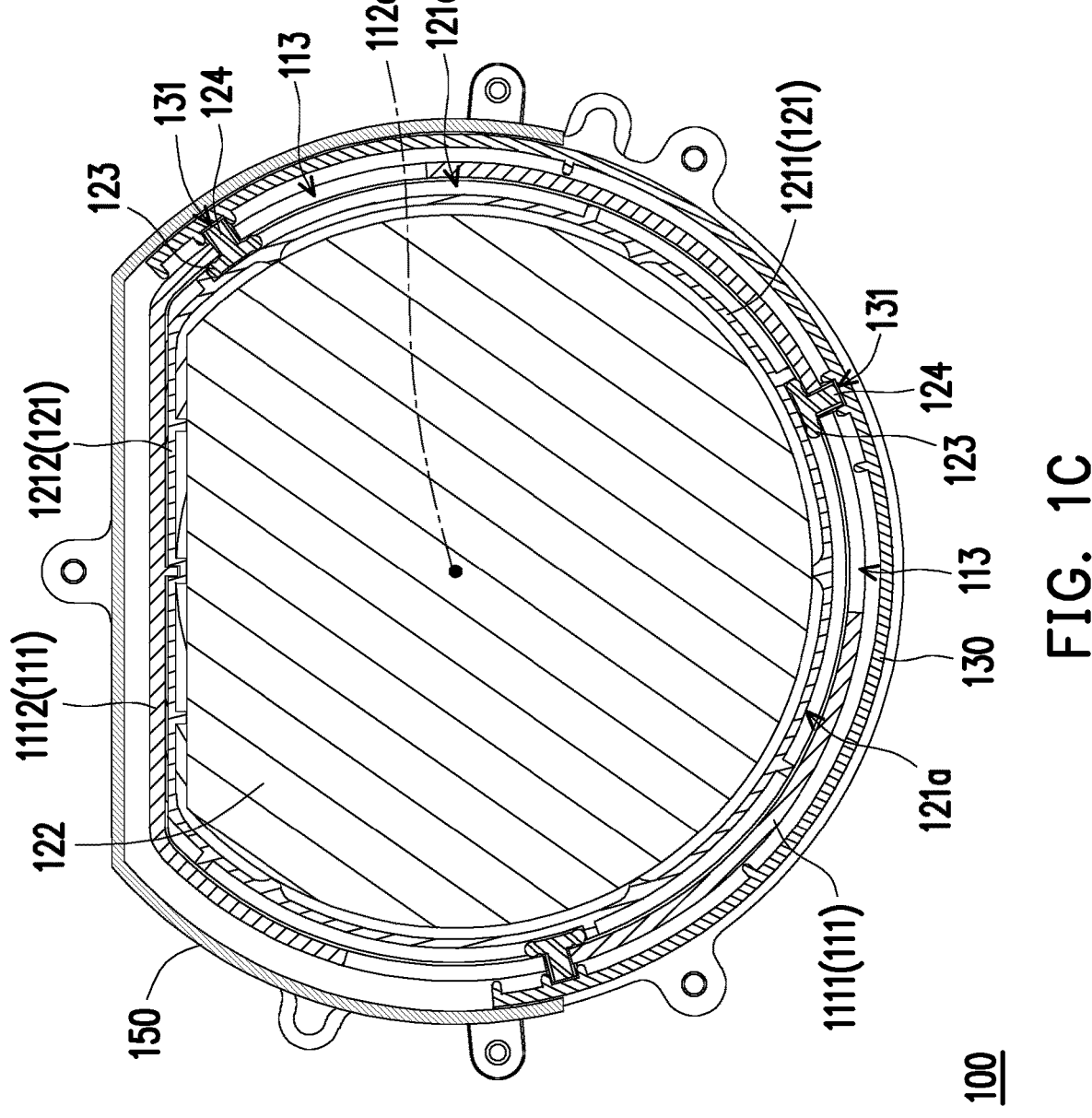
Figure 1D:
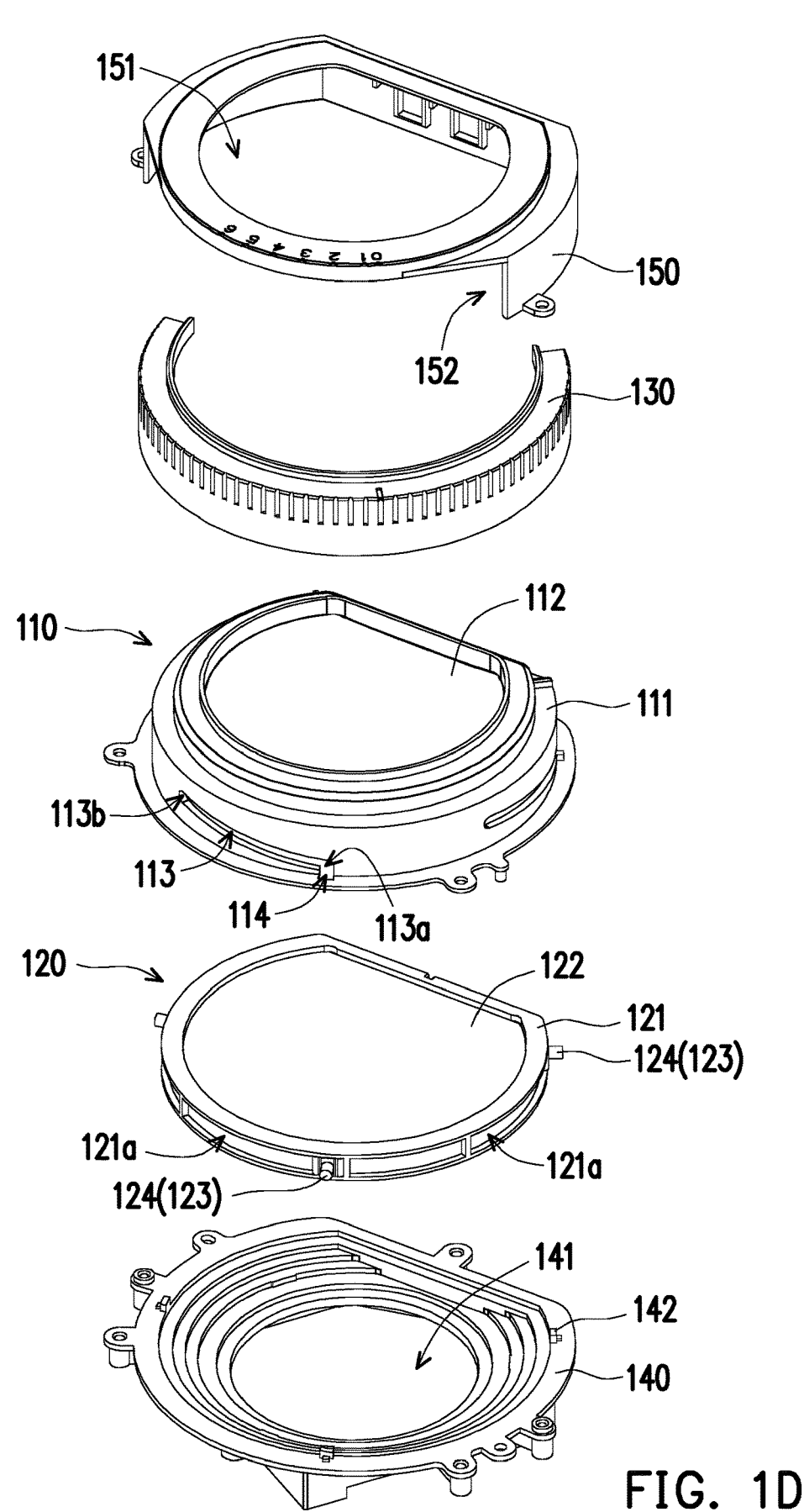
FIG. 1D is an exploded schematic view of the optical module of FIG. 1A.

FIG. 1A is a schematic view of an optical module in a first state according to an embodiment of the disclosure. FIG. 1B and FIG. 1C are cross-sectional schematic views of the optical module of FIG. 1A at two different viewing angles. FIG. 1D is an exploded schematic view of the optical module of FIG. 1A. With reference to FIG. 1A to FIG. 1D, in this embodiment, an optical module 100 may be a portion of a head-mounted display device to project image light emitted by a display (not shown) into the eyes of a user. To be specific, the optical module 100 includes a first lens assembly 110, a second lens assembly 120, an adjustment member 130, a base 140, and a housing 150. The first lens assembly 110 includes a first lens holder 111 and a first lens 112 fixed to the first lens holder 111, and the first lens holder 111 is locked and fixed to the base 140.

The first lens holder 111 has one or a plurality of guiding inclined grooves 113, and the first lens 112 has an optical axis 112*a*. In this embodiment, the first lens holder 111 is provided with a plurality of guiding inclined grooves 113 as an example (a number of the guiding inclined grooves 113 is plural), and the plurality of guiding inclined grooves 113 is distributed around the optical axis 112*a*. To be specific, each of the guiding inclined grooves 113 has a first stroke end 113*a* and a second stroke end 113*b* opposite to the first stroke end 113*a*. The first stroke end 113*a* is closer to the base 140 than the second stroke end 113*b*, and the second stroke end 113*b* is closer to the first lens 112 than the first stroke end 113*a*. In a direction parallel to the optical axis 112*a*, a stroke difference SD is provided between the second stroke end 113*b* and the first stroke end 113*a*.

As shown in FIG. 1B to FIG. 1D, the second lens assembly 120 is disposed in the first lens holder 111 and includes a second lens holder 121, a second lens 122, and one or a plurality of guiding members 123. The second lens 122 is fixed to the second lens holder 121, and the second lens holder 121 and the second lens 122 are adapted to slide synchronously in the first lens holder 111 in the direction parallel to the optical axis 112*a*. For instance, the first lens 112 may be a concave-convex lens and act as a fixed lens. Further, the second lens 122 may be a plane-convex lens and act as a movable lens.

Herein, a plurality of guiding members 123 are used as an example (a number of the at least one guiding members 123 is plural), and the plurality of guiding members 123 are slidably disposed on a periphery of the second lens holder 121 and are slidably connected to the plurality of guiding inclined grooves 113. Furthermore, the second lens holder 121 has a plurality of arc-shaped sliding grooves 121*a* distributed around the optical axis 112*a*. The plurality of arc-shaped sliding grooves 121*a* extend around the optical axis 112*a*, and the plurality of guiding members 123 are slidably disposed in the plurality of arc-shaped sliding grooves 121*a*. Therefore, the plurality of guiding members 123 can not only slide synchronously with the second lens holder 121 in the direction parallel to the optical axis 112*a*, but also slide relative to the second lens holder 121 in the plurality of arc-shaped sliding grooves 121*a*. It should be noted that although plural arc-shaped sliding grooves 121*a* are provided in this embodiment for the plural guiding members 123 to slide, one arc-shaped sliding groove 121*a* may also be provided only, with a radian extending around the optical axis 112*a* matches the number and position of the guiding members 123 for one or more guiding members 123 to slide in other embodiments.

As shown in FIG. 1A to FIG. 1C, in this embodiment, the adjustment member 130 may be rotatably sleeved on the first lens holder 111. Each of the guiding members 123 has a guiding protrusion 124 that penetrates through the corresponding guiding inclined groove 113, and the guiding protrusion 124 is coupled to the adjustment member 130. Further, the adjustment member 130 has a plurality of positioning grooves 131 extending in the direction parallel to the optical axis 112*a*, and the plurality of positioning grooves 131 are located on one side of the 5 adjustment member 130 facing the first lens holder 111. The plurality of positioning grooves 131 are distributed around the optical axis 112*a*, and the guiding protrusions 124 of the plurality of guiding members 123 penetrate through the corresponding guiding inclined grooves 113 and are slidably connected to the plurality of positioning grooves 131.

Figure 2A:
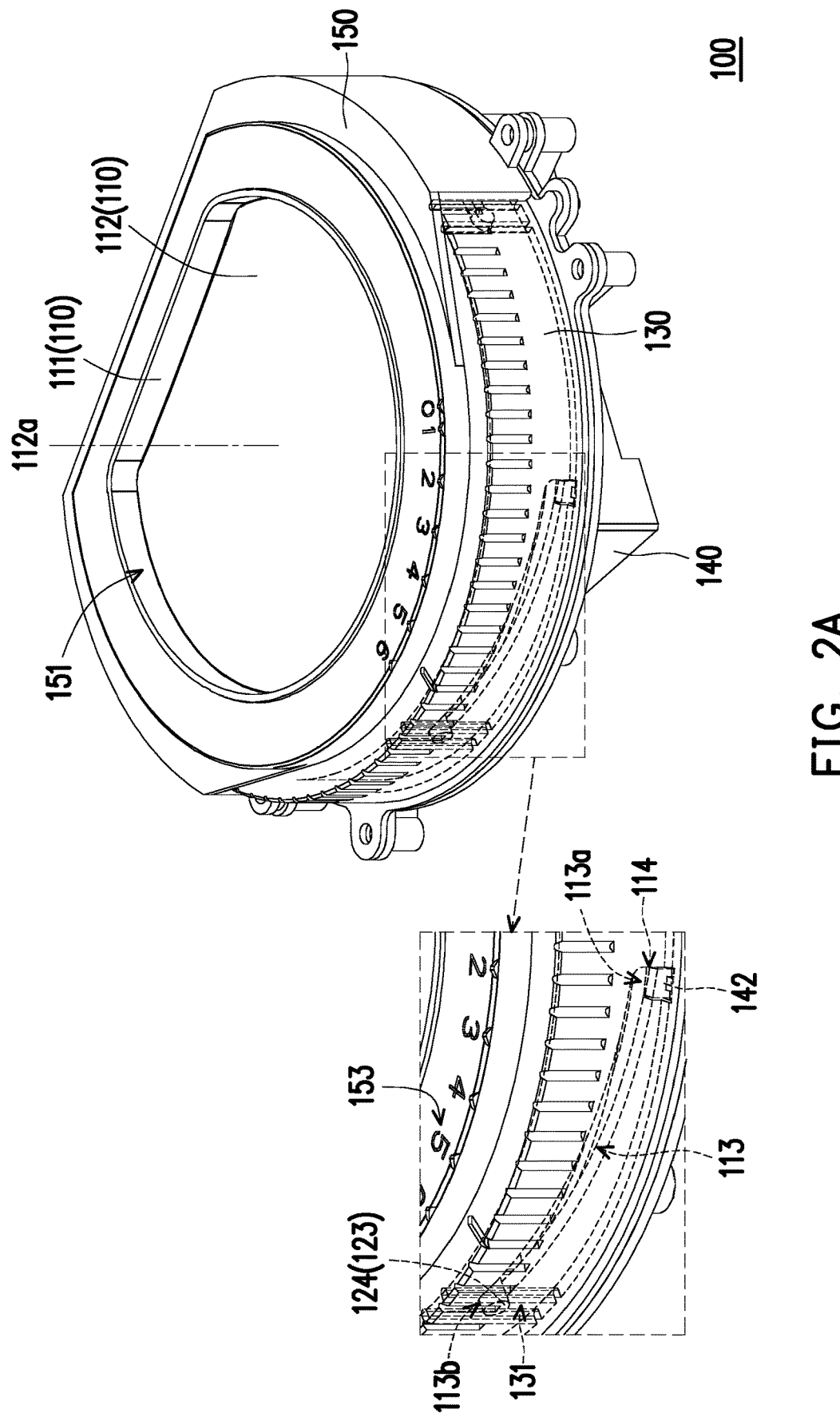
FIG. 2A is a schematic view of the optical module in a second state according to an embodiment of the disclosure.

FIG. 2A is a schematic view of the optical module in a second state according to an embodiment of the disclosure.

Figure 2B:
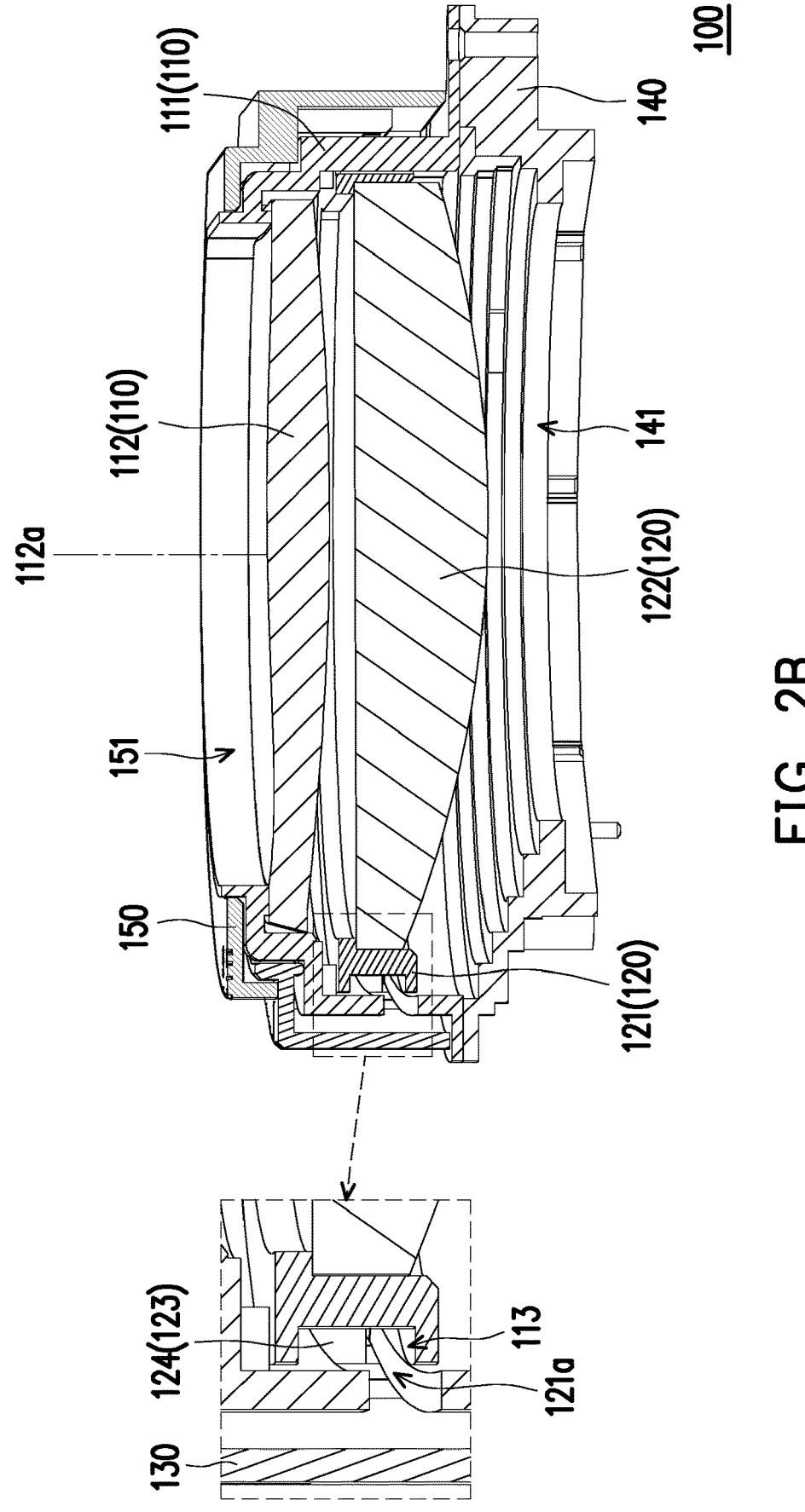
FIG. 2B and FIG. 2C are cross-sectional schematic views of the optical module of FIG. 2A at two different viewing angles.
Figure 2C:
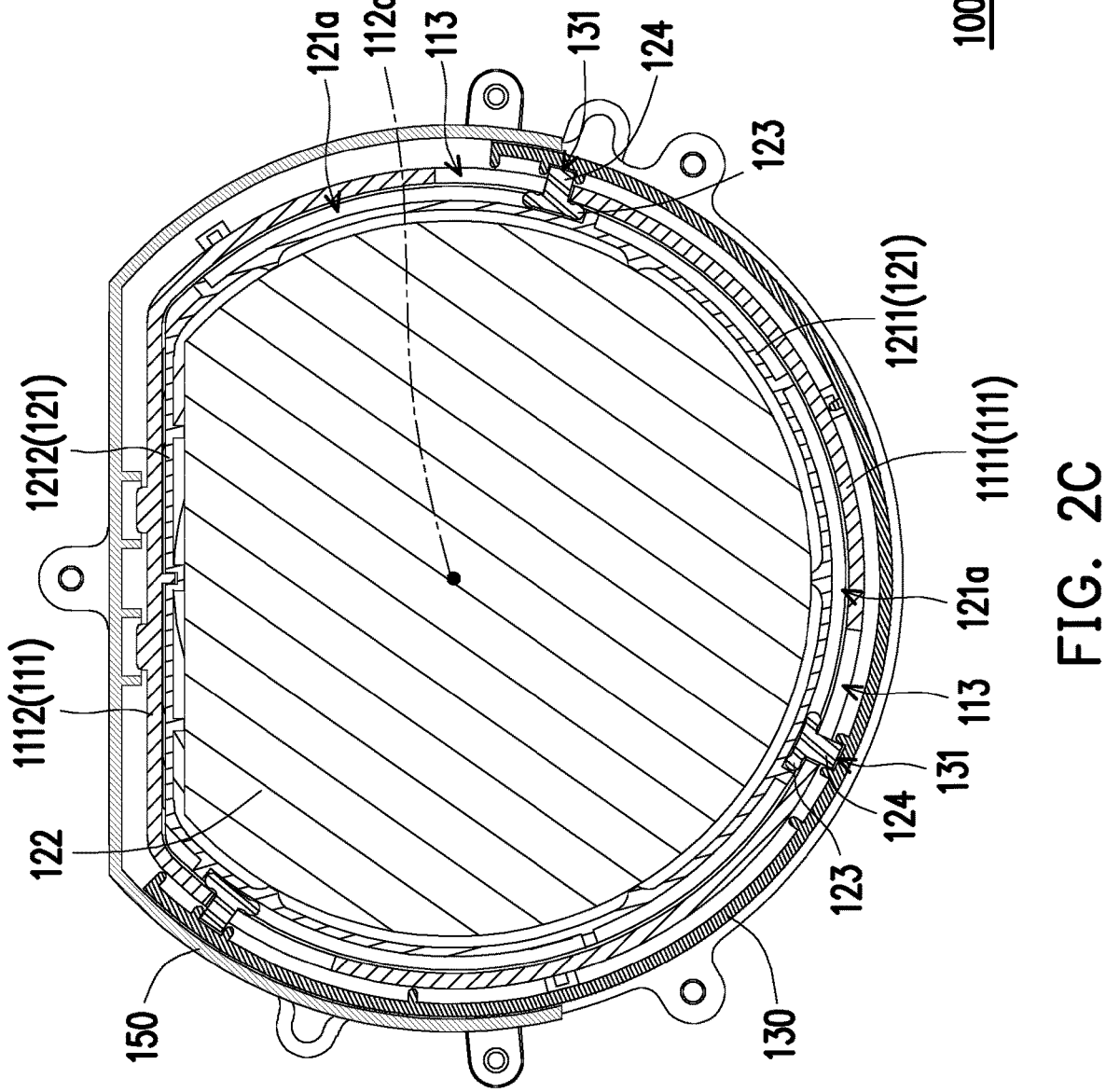

FIG. 2B and FIG. 2C are cross-sectional schematic views of the optical module of FIG. 2A at two different viewing angles. As shown in FIG. 2A to FIG. 2C, when the user turns the adjustment member 130 in a first rotation direction, the adjustment member 130 rotates around the optical axis 112*a* and drives the plurality of guiding members 123 to slide in the plurality of arc-shaped sliding grooves 121*a*. At the same time, the guiding protrusion 124 of each of the guiding members 123 slides toward the second stroke end 113*b* along the corresponding guiding inclined groove 113, so as to drive the second lens holder 121 and the second lens 122 to slide synchronously in the first lens holder 111 and approach the first lens 112.

In contrast, when the user turns the adjustment member 130 in a second rotation direction opposite to the first rotation direction, the adjustment member 130 rotates around the optical axis 112*a* and drives the plurality of guiding members 123 to slide in the plurality of arc-shaped sliding grooves 121*a*. At the same time, the guiding protrusion 124 of each of the guiding members 123 slides toward the first stroke end 113*a* along the corresponding guiding inclined groove 113, so as to drive the second lens holder 121 and the second lens 122 to slide away from the first lens 112 synchronously in the first lens holder 111, as shown in FIG. 1A and FIG. 1C.

As shown in FIG. 1A, FIG. 1B, FIG. 2A, and FIG. 2B, according to personal vision, the user can adjust a distance between the first lens 112 and the second lens 122 by turning the adjustment member 130 to adjust the position of the focal plane, so that the user can see a clear image. Furthermore, the stroke difference SD between the second stroke end 113*b* and the first stroke end 113*a* of each of the guiding inclined grooves 113 may be used to determine a sliding stroke of the second lens holder 121 and the second lens 122 in the direction parallel to the optical axis 112*a*.

On the other hand, when the guiding protrusion 124 of each of the guiding members 123 slides along the corresponding guiding inclined groove 113, each guiding member 123 may slide along the corresponding arc-shaped sliding groove 121*a*. In this way, it can be ensured that the second lens holder 121 and the second lens 122 sliding in the direction parallel to the optical axis 112*a* may not be driven by the adjustment member 130 to rotate around the optical axis 112*a*. Therefore, the optical axis of the second lens 122 may be prevented from shifting, so imaging quality is improved. For instance, an optical axis of the second lens 122 is coaxial with the optical axis 112*a* of the first lens 112.

As shown in FIG. 1C, the first lens holder 111 has a first arc-shaped segment 1111 and a first straight segment 1112 connected to the first arc-shaped segment 1111, and the plurality of guiding inclined grooves 113 are located on the first arc-shaped segment 1111. In addition, the second lens holder 121 has a second arc-shaped segment 1211 and a second straight segment 1212 connected to the second arc-shaped segment 1211, and the plurality of arc-shaped sliding grooves 121*a* and the plurality of guiding members 123 are located on the second arc-shaped segment 1211. The design of the abovementioned first straight segment 1112 and the second straight segment 1212 makes contours of the lens holders of the disclosure smaller than that of the lens holders of conventional circular lenses. In this way, the optical module may be prevented from interfering with the bridge of the user's nose, and the wearing comfort may be improved.

As shown in FIG. 1C, the second arc-shaped segment 1211 faces the first arc-shaped segment 1111, and the second straight segment 1212 faces the first straight segment 1112.

As shown in FIG. 1B, FIG. 1C, FIG. 2B, and FIG. 2C, based on matching between an inner contour of the first lens holder 111 and an outer contour of the second lens holder 121, for example, the matching between the D-shaped inner contour and the D-shaped outer contour, it is ensured that the second lens holder 121 and the second lens 122 driven by the adjustment member 130 may not rotate around the optical axis 112a of the first lens 112, but may only slide in the first lens holder 111 in the direction parallel to the optical axis 112a.

As shown in FIG. 1A, FIG. 1B, and FIG. 1D, in this embodiment, the housing 150 is locked and fixed to the base 140, and the first lens holder 111 is located between the housing 150 and the base 140. To be specific, the housing 150 has a light emitting opening 151 and a lateral opening 152, and the base 140 has a light receiving opening 141 opposite to the light emitting opening 151. The display (not shown) is installed on the base 140 corresponding to the light receiving opening 141. The second lens 122 is exposed from the light receiving opening 141, and the first lens 112 is exposed from the light emitting opening 151. Therefore, the image light emitted by the display may penetrate and be projected through the second lens 122 and the first lens 112 in sequence and be projected into the eyes of the user.

As shown in FIG. 1A and FIG. 2A, at least a portion of the adjustment member 130 is exposed from the lateral opening 152, so that the user may turn the adjustment member 130 easily. Furthermore, the housing 150 further has a scale 153 located between the light emitting opening 151 and the lateral opening 152, and the adjustment member 130 has an indicator symbol 132 corresponding to the scale 153. Furthermore, the indicator symbol 132 is exposed from the lateral opening 152, and the user can instantly know the adjustment status of the position of the focal plane according to the scale 153 pointed by the indicator symbol 132.

As shown in FIG. 1A and FIG. 1D, in this embodiment, the first lens holder 111 further includes one or a plurality of engaging slots 114, and the base 140 includes one or a plurality of engaging protrusions 142. Herein, a plurality of engaging slots 114 and engaging protrusions 142 matching each other are used as an example for description. The plurality of engaging slots 114 are connected to the plurality of first stroke ends 113a of the plurality of guiding inclined grooves 113, and the plurality of engaging protrusions 142 are inserted into the plurality of engaging slots 114, so that the first lens holder 111 is engaged with the base 140.

Based on the engagement design between the first lens holder 111 and the base 140, not only the first lens holder 111 is accurately positioned on the base 140, but the installation reliability of the first lens holder 111 and the base 140 may also be improved. Further, the guiding members 123 are prevented from being detached from the first stroke ends 113a after being installed into the guiding inclined grooves 113.

Figure 3:
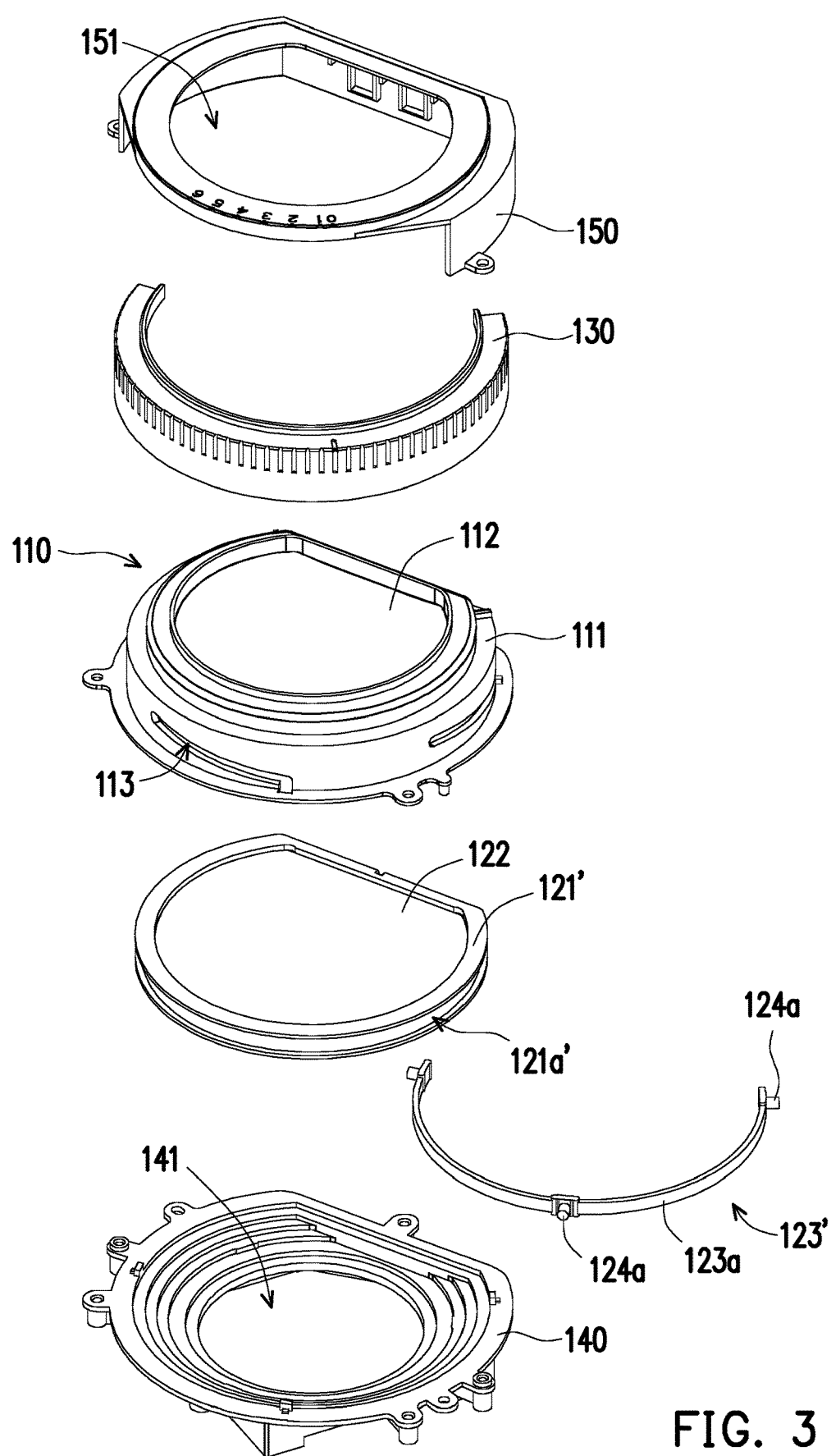
FIG. 3 is an exploded schematic view of an optical module according to another embodiment of the disclosure.

FIG. 3 is an exploded schematic view of an optical module according to another embodiment of the disclosure. With reference to FIG. 3, different from the optical module 100 provided in the foregoing embodiments, in an optical module 100A provided by this embodiment, a guiding member 123' includes a guiding body 123a and a plurality of guiding protrusions 124a connected to the guiding body 123a. Correspondingly, a second lens holder 121' has an arc-shaped sliding groove 121a' extending around the optical axis 112a. To be specific, the guiding body 123a has an arc-shaped structure and is slidably disposed in the arc-shaped sliding groove 121a'. For instance, a radian of the arc-shaped sliding groove 121a' is greater than or equal to π.

It is particularly noted that the plurality of guiding members 123 in the foregoing embodiments are arranged in separate configurations, so the demand for lightweight design is satisfied, as shown in FIG. 1C and FIG. 1D. Different from the above, the guiding member 123' of this embodiment is an integrally formed one-piece structure, so the synchronization and consistency of the action may be ensured, as shown in FIG. 3.

In view of the foregoing, according to personal vision, the user can adjust the distance between the first lens and the second lens by turning the adjustment member to adjust the position of the focal plane, so that the user can see a clear image. During the process of adjusting the position of the focal plane, the first lens remains stationary, and the second lens slides closer to or away from the first lens along the direction parallel to the optical axis of the first lens. Further, the sliding second lens does not rotate around the optical axis of the first lens, so the optical axis 5 of the second lens may be prevented from shifting, and the imaging quality is thus improved. In addition, in the disclosure, the lenses do not need to be designed to be circular because the lenses do not need to rotate. Therefore, the shape of the lenses may be arbitrarily designed according to space requirements, so the optical module is prevented from interfering with the bridge of the user's nose, and the wearing comfort is thus improved.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An optical module, comprising:
a first lens assembly comprising a first lens holder and a first lens fixed to the first lens holder, wherein the first lens holder has at least one guiding inclined groove, the first lens has an optical axis, the at least one guiding inclined groove has a first stroke end and a second stroke end opposite to the first stroke end, and in a direction parallel to the optical axis, a stroke difference is provided between the second stroke end and the first stroke end;
a second lens assembly comprising a second lens holder slidably disposed in the first lens holder, a second lens fixed to the second lens holder, and at least one guiding member slidably disposed in the second lens holder and slidably connected to the at least one guiding inclined groove; and
an adjustment member rotatably sleeved on the first lens holder, wherein the at least one guiding member penetrates through the at least one guiding inclined groove to be coupled to the adjustment member, and when the adjustment member rotates around the optical axis of the first lens, the adjustment member drives the at least one guiding member to slide relative to the second lens holder and the at least one guiding member slides relative to the first lens holder along the at least one guiding inclined groove, so as to drive the second lens holder to slide relative to the first lens holder in the direction parallel to the optical axis.

2. The optical module according to claim 1, wherein the adjustment member has at least one positioning groove extending parallel to the optical axis, and the at least one guiding member is slidably connected to the positioning groove.

3. The optical module according to claim 1, wherein the second lens holder has at least one arc-shaped sliding groove extending around the optical axis of the first lens, and the at least one guiding member is slidably disposed in the at least one arc-shaped sliding groove.

4. The optical module according to claim 1, wherein a number of the at least one guiding inclined groove is plural, a number of the at least one guiding member is plural, the guiding inclined grooves are distributed around the optical axis of the first lens, and the guiding members are slidably connected to the guiding inclined grooves.

5. The optical module according to claim 4, wherein the second lens holder has a plurality of arc-shaped sliding grooves distributed around the optical axis of the first lens, and the guiding members are slidably disposed in the arc-shaped sliding grooves.

6. The optical module according to claim 1, wherein a number of the at least one guiding inclined groove is plural, the guiding inclined grooves are distributed around the optical axis of the first lens, and the at least one guiding member comprises a guiding body and a plurality of guiding protrusions connected to the guiding body and slidably connected to the guiding inclined grooves.

7. The optical module according to claim 6, wherein the second lens holder has an arc-shaped sliding groove extending around the optical axis of the first lens, and the guiding body is slidably disposed in the arc-shaped sliding groove.

8. The optical module according to claim 7, wherein a radian of the arc-shaped sliding groove is greater than or equal to π.

9. The optical module according to claim 1, wherein the first lens holder has a first arc-shaped segment and a first straight segment connected to the first arc-shaped segment, the second lens holder has a second arc-shaped segment and a second straight segment connected to the second arc-shaped segment, the second arc-shaped segment faces the first arc-shaped segment, and the second straight segment faces the first straight segment.

10. The optical module according to claim 1, further comprising:

a base, wherein the first lens holder is fixed to the base; and a housing fixed to the base, wherein the first lens holder is located between the housing and the base, the housing has a light emitting opening and a lateral opening, the first lens is exposed from the light emitting opening, and at least a portion of the adjustment member is exposed from the lateral opening.

11. The optical module according to claim 10, wherein the housing further has a scale located between the light emitting opening and the lateral opening, the adjustment member has an indicator symbol corresponding to the scale, and the indicator symbol is exposed from the lateral opening.

12. The optical module according to claim 10, wherein the first lens holder further comprises at least one engaging slot connected to the first stroke end, and the base comprises at least one engaging protrusion inserted into the engaging slot.

13. The optical module according to claim 10, wherein the base has a light receiving opening opposite to the light emitting opening, and the second lens is exposed from the light receiving opening.

* * * * *